(12) United States Patent
Bruhn

(10) Patent No.: US 10,315,555 B2
(45) Date of Patent: Jun. 11, 2019

(54) ELECTRONIC MONITORING OF THE LOAD SECURING SYSTEM OF VEHICLES

(71) Applicant: TERRA CONTROL GEOLOGISCHE BERATUNG UND UMWELTTECHNIK GMBH, Ober-Mörlen (DE)

(72) Inventor: Dirk Bruhn, Ober-Mörlen (DE)

(73) Assignee: TERRA CONTROL GEOLOGISCHE BERATUNG UND UMWELTTECHNIK GMBH, Ober-Moerlen (DE)

( * ) Notice: Subject to any disclaimer, the term of this patent is extended or adjusted under 35 U.S.C. 154(b) by 257 days.

(21) Appl. No.: 15/505,716

(22) PCT Filed: Aug. 20, 2015

(86) PCT No.: PCT/DE2015/000417
§ 371 (c)(1),
(2) Date: Feb. 22, 2017

(87) PCT Pub. No.: WO2016/029895
PCT Pub. Date: Mar. 3, 2016

(65) Prior Publication Data
US 2017/0267159 A1    Sep. 21, 2017

(30) Foreign Application Priority Data
Aug. 23, 2014   (DE) .................. 10 2014 012 508

(51) Int. Cl.
*B60Q 1/00*   (2006.01)
*B60P 7/08*   (2006.01)
(Continued)

(52) U.S. Cl.
CPC ............ *B60P 7/0861* (2013.01); *G01G 19/12* (2013.01); *G08B 21/182* (2013.01)

(58) Field of Classification Search
CPC .................................... B60P 1/00; G01C 1/00
See application file for complete search history.

(56) References Cited

U.S. PATENT DOCUMENTS

| | | | | |
|---|---|---|---|---|
| 6,697,725 | B1 * | 2/2004 | Williams | B60K 23/0808 180/249 |
| 7,112,023 | B1 | 9/2006 | Tardif | |
| 2007/0103280 | A1 * | 5/2007 | Kanafani | B60D 1/248 340/431 |

FOREIGN PATENT DOCUMENTS

| | | | |
|---|---|---|---|
| CA | 2 377 296 A1 | 8/2003 | |
| DE | 100 18 302 A1 | 10/2001 | |

(Continued)

*Primary Examiner* — Shirley Lu
(74) *Attorney, Agent, or Firm* — McGlew and Tuttle, P.C.

(57) ABSTRACT

Vehicle which has a loading area, on which a load can be placed and by means of at least one load detector the presence of said load on said loading area can be detected, and by means of a central control unit the signals of all said load detectors can be detected and the measured value of the mass of said load can be detected, whereby said load can be secured by means of at least one movable, mechanical and flexible load securing device, which can be brought into contact with said load, and by means of at least one safety sensor the value of the force can be detected with which said load securing device acts on said load and for this force said central control unit calculates a reference value, depending on the mass of said load and according to a formula for the relevant applicable regulations and thereupon checks, if the actual value is sufficient.

9 Claims, 1 Drawing Sheet

(51) Int. Cl.
*G01G 19/12* (2006.01)
*G08B 21/18* (2006.01)

(56) References Cited

FOREIGN PATENT DOCUMENTS

DE  10 2005 001 480 B3  10/2006
DE      196 45 503 B4  10/2006
DE      103 16 993 B4   6/2007

* cited by examiner

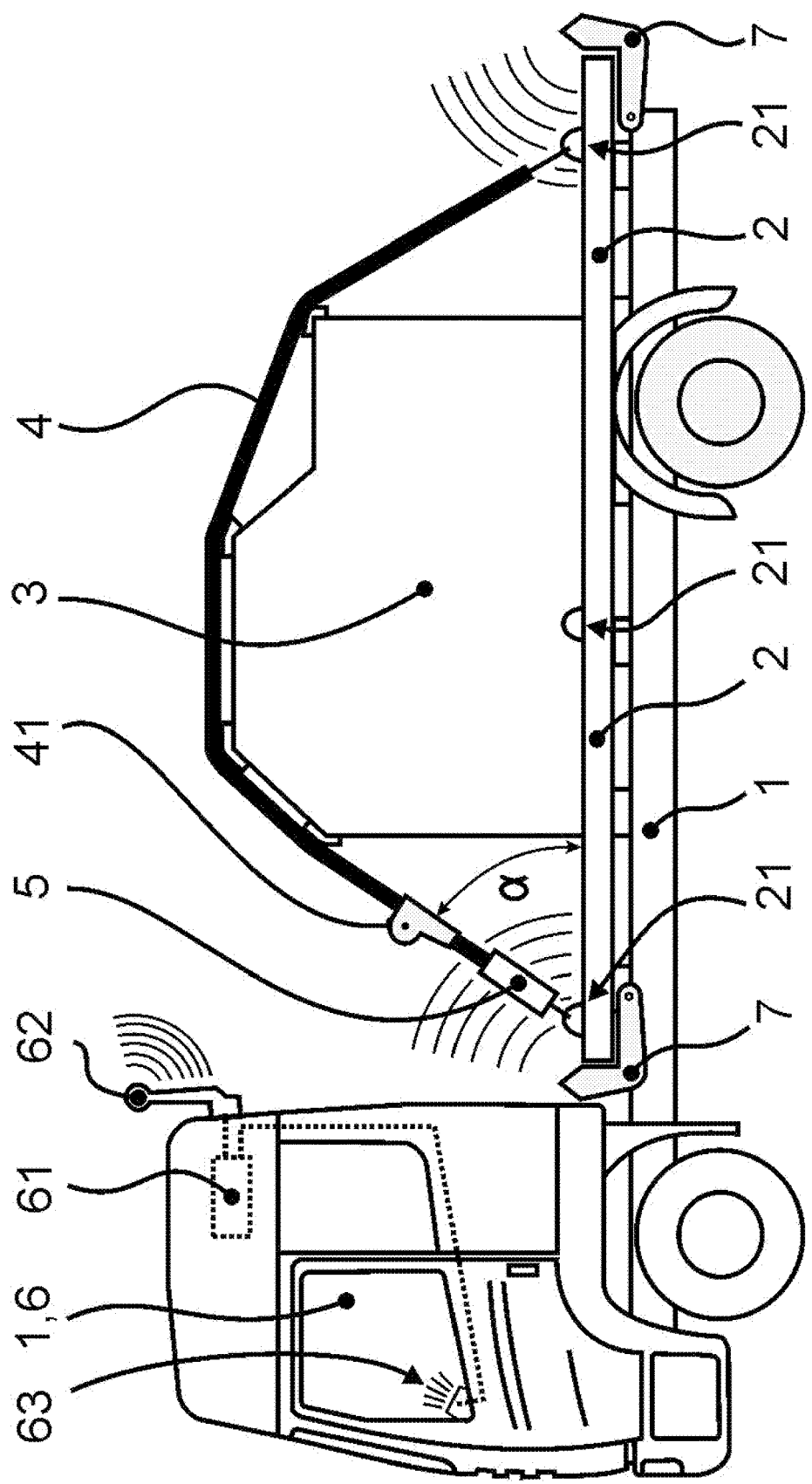

ELECTRONIC MONITORING OF THE LOAD SECURING SYSTEM OF VEHICLES

The invention is related to a vehicle which has a loading area, on which a load can be placed and by means of at least one load detector the presence of said load on said loading area can be detected, and by means of a central control unit the signals of all said load detectors can be detected and the measured value of the mass of said load can be detected.

All vehicles transporting cargo on land, on water or in the air are during their journey subject to accelerations and decelerations in all directions, which can move and/or upset the load within the vehicle on its loading area. This can lead to damage to the load up to the upset, crashing or sinking of the vehicle and the total loss of the load. For this reason, it is customary and regulated by many prescriptions that belts, ropes, chains, brackets or other mechanical load securing devices are applied to the load of a vehicle, which fix the load on the loading area.

Non-standardized cargo goods are usually lined with belts, ropes or chains, which in turn are fastened to the loading area in eyelets, rings, tabs, hooks, brackets or other holders.

It is a disadvantage that the function of all these fixtures always depends on the fact that they have to be activated manually by staff with a minimum of training and being aware of his responsibility. In case of doubts about the proper execution, another person with increased sense of responsibility must check the proper activation of the load securing devices at all relevant locations on the loading area.

The patent documents DE 196 45 503 B4 and DE 103 16 993 B4 disclose that a load detector detects the presence of cargo on vehicles and a mechanical load securing device fixes the cargo and a securing sensor checks whether all load securing devices are truly activated. Because not only belts, but also all other longish and slender load securing devices are always elastic, the safety sensor or another sensor for the clamping force checks whether the load securing devices are pretensioned with a certain given minimum value. This information is recorded by a control module and made visible to the vehicle operator.

DE 10 2005 001 480 B3 also describes a load detector, in particular for trucks, which reports the presence of load to a control module. CA 2377296 A1 describes belts as load securing devices for trucks. One sensor per belt reports to a control module whether the belt is tensioned with a certain minimum force.

However, these reporting systems have not been implemented in practice at all. Their main disadvantage is that they do not facilitate the work and the responsibility of a truck driver: He himself can detect the presence of cargo with a single view on the loading area. And he must do this anyway, because he himself is responsible for the manual activation of all load securing devices.

The subsequent message from the control unit that all load securing devices are under tension is no longer a new information for the driver. It can even demand superfluous work from him: If a loading area with several load securing devices is occupied only partially, but this subarea can not be supervised separately from a single summary load detecting signal, the control module warns that a load securing device is not activated although none is necessary in the unloaded subarea. In this particular case, the driver must either have the option to delete the false message or he is forced to activate the actually superfluous load securing device nevertheless. Both are an invitation to sabotage an equipment which claims to increase the safety of the cargo.

It is also unhelpful for the driver if the control module reports a certain minimum value as an actual tension force in the load securing devices. If the driver has previously manually tensioned all the load securing devices himself, he has already detected the dimension of the tensioning force without any additional effort. Instead, the control module leaves the driver alone in his or her core task, namely in the determination which value of the pretension force is physically correct and is according to the applicable regulations.

In the extreme case of a very bulky, particularly lightweight and sensitive payload a single positive message of load detection may require the activation of several load securing devices. Their fixed minimum value tension force can exert such a high pressure on sensitive areas of the load, that the load will be damaged. Again, the driver is forced to activate a belt e.g. underneath of the load or to ignore or to delete a nonsensical message from the control module.

In the other extreme case of a very compact and heavyweight payload, e.g. a large metal rod, the control module signals the activation of all load securing devices, each with its given clamping force. If, however, the value of this clamping force is much too low for the actual weight of the metal rod, the message of the control module pretends safety, which is deceptive. If an accident occurs, the additional control module is not a gain in safety, but a loss of it.

When the DE 103 16 993 B4 suggests as an option that the "user enters a threshold value" for the clamping force, the safety device is thereby completely devalued. It is reduced to a superfluous, additional step for the self control during the loading work.

DE 196 45 503 B4 and DE 10 2005 001 480 B3 suggest at least a detection of the total weight of the load. This is, however, only used to answer the question of whether a loading of the entire vehicle is permissible at all. None of the afore listed references mention any connection between the weight of the load and the required clamping force in the load securing devices. Even though DE 196 45 503 B4, DE 103 16 993 B4 and CA 23 77 296 A1 have all given themselves the task of substantially improving load securing on vehicles, in order to avoid accidents due to shifting loads.

The object of this invention is to avoid these disadvantages by the development of a central control unit which can check quickly and easily whether the load of a vehicle is sufficiently secured and whether this safety device satisfies the respectively applicable regulations. A refined variant of a solution shall, alternatively, be restricted to the use of load securing devices with a relatively low tension force, and shall calculate the necessary number of such load securing devices.

As solution teaches the invention that the load can be secured by means of at least one movable, mechanical and flexible load securing device, which can be brought into contact with said load, and by means of at least one safety sensor the value of the force can be detected with which said load securing device acts on said load and for this force said central control unit calculates a reference value, depending on the mass of said load and according to a formula for the relevant applicable regulations and thereupon checks, if the actual value is sufficient.

It is the basic idea of this invention to provide a single, central control unit for the entire solid load on the loading area of every vehicle. To this unit will be reported via a first sensor, the load detector, whether a load is present on the loading area. In a positive case the control unit asks by means of a second sensor, the safety sensor, whether a mechanical device—the load securing device—is applied to the load or brought into it, and whether it is actually in a state in which it secures the load against movements on the loading surface.

For this purpose, the safety sensor measures the force with which the load securing device acts on the load. If a force is measurable at all, the load securing device is activated. The central control unit also measures the mass of the load. Stored in the control unit is that formula, which calculates as a function of the mass of the load whether the measured actual value of the tension force in the load securing device complies with the applicable regulations. As a result the control unit outputs the message whether or not the required tension force is achieved.

An essential part, which is however only optional in principle, is a display which signals to the driver of a truck or of a ship or of an aircraft that load is present and whether this is secured properly or not. In a very simple embodiment, a control light is assigned to each load detector. It lights up red when the load detector signals the presence of a load, but a signal is missing that the tension force in the associated load securing device is sufficient. As soon as this signal is active, the control light switches to the green colour.

A very useful additional equipment is a further control lamp, which indicates the operational readiness of the central control unit itself and the connected sensors.

Additionally or alternatively, the informations out of the central control unit may be sent to a different location, e.g. to the headquarter of the truckage company, the shipping company, the airline or a supervising authority. A time-dependent storage of the data on board of the vehicle or outside is also sensible. The required size of the data memory can be limited by overwriting the oldest data record always by the latest, just arrived record.

The invention prefers an electrical or electromagnetic connection between the sensors and the central control unit, which is equipped with electrical interfaces for this purpose. In this case, the central control unit consists of a housing with electronic components on a circuit board. The mechanical interfaces of the load detector, the measuring devices for the mass of the load and the safety sensors in the load securing devices shall be adapted to the design of the respective vehicle, its equipment and the respective valid regulations.

For this invention a vehicle is a truck, a passenger car having a loading area, a railway carriage or another land vehicle, or a boat or another vessel or an air cushion vehicle or a ground effect vehicle or a plane or another aircraft or a spacecraft or a suitable trailer.

The load securing device in the inventive sense is a movable mechanical component which is mounted on the loading area or in the vicinity thereof. It is more or less flexible in itself.

Retaining brackets, partition walls or protective gratings are examples of low-flexible load securing devices. They can be pivoted or shifted in relation to the loading area by at least one axis of motion, so that they are removed from the loading area during loading and are subsequently brought into mechanical contact with the load.

If a single seagoing container with an unsecured partial load inside is loaded onto a truck and fastened thereon with twist locks, during evasive manoeuvres or braking of the truck the load inside of the container may slip and get out of place, what can lead the entire vehicle being overturned. The task of adequately securing and supervising the load within the container is the same as securing any load on the loading area of a truck.

For variable, non-standardized loads of different sizes and dimensions, a flexible load securing device is useful. It consists of a net and/or a laminar, textile material and/or at least one chain and/or at least one rope and/or at least one lashing belt and/or another longish and in itself flexible element or is a composite of several such elements.

As already mentioned, each flexible load securing device, such as, for example, a belt, but also a retaining bracket, is more or less elastic in itself. If it rests only loosely on the load, it can not hold the load when the vehicle is decelerated. As a result of the kinetic energy stored therein, the load becomes progressively faster in relation to the loading area, so that the load securing device is abruptly tautened and thereby possibly overloaded. The distribution of the load is changed unfavourably and in an extreme case the load securing device cracks or breaks, whereupon the load slides down from the loading area.

In order to prevent this, for example, a belt or a chain must be pretensioned with a specific force, which is determined in accordance with the mass of the load to be transported in particular valid regulations such as, for example, the VDI Directive 2700. The value of the mass must be measured by a suitable measuring device during loading and recorded by the central control unit. It is not sufficient to estimate the value.

It is the driver's responsibility to ensure that a belt or other load securing device is pretensioned with the required force. In a load securing device according to the invention, a measuring device is installed for the amount of the actually applied pretensioning force. This measuring device does not only record the exceeding of a threshold, but the respective amount of the force and transmits this information to the control unit. A suitable sensor is, for example, a curved leaf spring, which is clamped at both ends and loaded centrally with the tensile force. The position of the spring is electrically recorded and directed to the central control unit. Another suitable measuring sensor is, for example, a strain gauge, which is mounted on a metal plate.

For every type of load securing device the mechanics and the geometry of the force sensor must be adapted to whether the load securing device wraps around the load, is pressed onto it or pressed therein. When the load securing device is a belt, a chain or a rope, the sensor is preferably inserted or added as an intermediate member therein.

In the practice of load securing quite often not only a single, one-piece load is positioned and secured on a loading area, but rather several pieces. For this case, the invention proposes that the loading area shall be divided into subareas whose number and size are oriented according to the smallest size of the load, which can be expected with some frequency. Each of these subareas must be controlled by load detectors and has to be distinguished from the neighboring subarea.

Each subarea may be equipped with its own load detecting device. An advantageous embodiment is a double-layered and air-tight anti-skid mat, which rests on the loading area. The two layers are connected to each other at their corners and at the separating lines of the subareas in an air-tight manner, so that air-filled chambers are formed. For the detecting of the load there are contacts arranged at the inner surfaces of the chambers, which are pressed on each other by the mass of the load and thereby activated.

Another embodiment for the detecting of the load are at least three cameras, ultrasound sensors or radar sensors, which are preferably mounted at the corners of the loading area. Based on their signals an electronic evaluation module inside of the central control unit calculates which subareas of the loading area are occupied with a load.

A suitable load securing device with a safety sensor must be assigned to each subarea. If this allocation is not determined by a mechanical construction, but can be selected freely, for example in the case of a belt, which can optionally be latched into two of a plurality of lashing eyes, the selected assignment must be reported to the control unit. In principle is conceivable a manual input by an operator.

However, the invention prefers that the respectively selected fastening location of each safety sensor on the loading area is automatically detected and stored by the control unit. This determination of the location can, for example, be additionally integrated into three load sensors at the corners of the loading area, which detect the direction of signals from the safety sensors and report them to the control module, which calculates the respective point on the loading area.

As load detectors already have been mentioned switching contacts, ultra-sound sensors, a radar device or a camera. Laser beam or photoelectric sensors are alternatively used. Among other variants light-emitting bars are suitable, which are arranged on a side wall of the loading area and form a light curtain. The emitted beams are received on the opposite side wall in a receiver strip only where no load is intercepting the light beam.

In addition to the contactless detection of the load it can also be detected by means of contacting sensors. Already mentioned are switching contacts on the inner surfaces of air chambers in a double-layer anti-slip mat. Alternatively, the load on these air cushions can be measured by the change in the air pressure. Conceivable are vertically movable pins in bores of the loading area, whose spherical or conical tips are pushed downwards by the load against the force of a spring. These pins can be extended to angled pivoting levers which are movable with a pivotal joint in or on the loading surface. A short stroke movement at the load sensing tip is translated by the lever into a long movement at the other lever end. Alternatively all other devices and methods for determining the position of an object on a plane which are currently known and will be known in the future can also be used.

In the case of vehicles for one-piece loads, it is sufficient to measure the mass of the load by means of changes on the vehicle after the load was placed on it. Examples are the change in ground clearance, the contraction of the undercarriage, the change of the air pressure in air-filled tires of a land vehicle or an aircraft still on ground, the change in the mean immersion depth of a vessel or the measurement of the deformation of a structure below the loading area. Numerous sensors are available on the state of the art for measuring these parameters. From the magnitude of this signal the conclusion to the mass of the load is drawn and the required tensioning force in the load securing device is calculated inside of the central control unit.

The invention prefers electrical connections between the central control unit and the safety sensors as well as the load detectors. It is, of course, possible that each sensor and each detector is connected to the control unit via a cable. However, in order to reduce the number of cables and plug-in connections, it is more advantageous to cable the mentioned components in a star-shaped and/or annular manner with one another and with the control unit, and to transmit all messages and receive all queries by means of a CAN bus or another bus system via this cable.

The often harsh operation of a load transporter causes increased wear for the electrical cables, so that a wireless connection is more robust. Therefore, the invention proposes to connect the safety sensors and the other sensors and/or the load detectors with the control unit via an RFID (radio frequency identification system) or another radio link.

Via this link not only data can be received and queries sent, but also electrical energy can be transported so that the sensors and detectors do not need their own energy storage. Alternatively, however, electrical batteries are known in robust versions, which provide sufficient amounts of energy over several years of typical operation.

An alternative to or supplementation of a battery is an electric generator which during the load-securing-procedure branches off an extremely small part from the mechanical energy for tensioning the load securing device or from the shocks of the load due to the travel of the vehicle on an uneven surface and converts it into electrical energy. For this purpose, a first part of the generator, for example an electric coil, is mechanically connected to a first part of a load securing device. The latter moves during the activation of the load securing device or by shocks during the travel of the vehicle, relative to a second part of the load securing device, which is connected to a second part of the generator, for example a permanent magnet. The motion of the permanent magnet induces an electric current in the coil which feeds the sensors and detectors.

Each safety sensor is in principle assigned to a very specific load securing device and, in its activated state, is mechanically fixedly connected thereto because only then a central monitoring is possible. It is a useful variant to arrange the safety sensors below the loading area and to connect them there with lashing eyes or other fastening elements for mechanical load securing. Onto the shaft of such a lashing eye a strain gauge can be glued on. Alternatively, the shaft is movable in a linear plain bearing against the force of a spring. A Hall-Generator scans the respective position of the lashing eye. From this signal the tension force is calculated.

If the loading area and the fastening elements arranged thereon shall not to be changed by a safety monitoring according to the invention, the safety sensors must be integrated in the load securing devices. If they are in their activated operating state located on the loading area in a clearly defined location this position can be permanently stored in the central control unit. If, however, a safety sensor is installed in a belt, a rope or a chain, which can be attached to different eyelets or hooks, it makes sense that the location of the selected hook is automatically communicated to the control module. For this purpose the accuracy of a GPS module (Global Positioning System Module) may be not sufficient. An onboard orientation system will be more precisely, such as three receivers at the corners of the loading area, each receiving the direction of a signal from the safety sensor and transferring this information to the central control unit, in which the current location of the sensor is determined there from.

If such a locating signal is transmitted and evaluated from both ends of a belt, and if the load detectors detect the location and the size of the load, the central control unit can even check whether the load is secured on all sides in accordance with regulations. If, for example, only one belt runs from the front to the rear over the load, but a belt from the left to the right is still missing, the control unit will issue a warning "Side belt missing!"

If for example, in the case of a construction machine, the belts are only hooked in the load, but not guided over it, and the two rear belts are only connected to the nearest corners of the load by the shortest route, but do not cross each other contrary to the regulations, then the control unit outputs the warning message: "Please cross the rear belts!"

When lashing a cargo, the angle between the belt and the loading surface—the so-called lashing angle—should be as close as possible to 90°. When it is less than about 83°, the tensioning force in the belt must be correspondingly increased. It is calculated according to the following formula:

$$S_{tf} = F_g \times ((a-\mu)/(\mu \times \sin \alpha)), \text{ whereby applies:}$$

$S_{tf}$: Pretensioning force in the belt
$F_g$: Force of the weight of the load
a: maximum acceleration as a fraction of the weight Fg, usually 0.8 in the direction of travel and 0.5 transversely to the direction of travel,
μ: the coefficient of kinetic friction of the load on the loading area
α: lashing angle between the belt and the loading area.

The invention therefore proposes that, as an additional equipment, a sensor for detecting the lashing angle α is also installed in the belt and its information is passed on to the central control unit. Sensors of this type are known from the state of the art and are available out of catalogues. If, in addition, the weight of the load is also detected by a corresponding sensor and is transferred on to the central control unit or is otherwise detected by the control module, the required tensioning force can be calculated there according to the abovementioned formula.

The formula for calculating the pretensioning force mentioned in the previous paragraph shows the great influence of the coefficient of kinetic friction on the final result. A measuring device is conceivable, which measures the respective current value of the coefficient of kinetic friction on the loading surface of the vehicle precisely, e.g. with friction elements of different materials and transmits it to the control unit. But the effort to do so will be so great in practice that such an easing of work for the responsible vehicle driver will not be generally accepted. Especially because in the rough everyday operation it will be of primary importance whether an anti-slip mat with a μ of about 0.6 is placed under the load or whether the load stands with rubber tires on a dirty steel surface, i.e. μ of about 0.3, or whether metal elements contact a dry loading surface made of metal, μ of approximately 0.1, or whether spilled mineral oil has greased the loading surface, so that the coefficient of kinetic friction for metal on greasy metal drops down to only μ=0.01. As a result, the vehicle driver should primarily clean the loading area and put anti-slip-mats underneath the load. The output of this activity is of such a great influence that the responsible driver must enter the relevant coefficient of kinetic friction into the control unit at least roughly even in a hectic practice.

If, as described above, the central control unit is informed about the location of the beginning and the end of each belt, the pretensioning force currently set, and the approximate size and limitation of the load, the control unit it is able to issue a message indicating whether the number of belts are sufficient and whether or not these belts are sufficiently pretensioned.

An equivalent message can be issued if belts are used, whose holding force is limited to a specific value. In this case, the central control unit gives a message as to whether the number of prestressed belts in the direction of travel and transversely to the direction of travel is sufficient.

The invention assumes that a one-piece load is located in the entire loading area or in each subarea. If several pieces of load of very different size and very different weight are to be loaded and secured onto a vehicle, it is strongly recommended to divide the entire loading area into subareas adapted for this purpose. However, if a vehicle driver decides to load two or more comparatively small pieces of load as a group onto a relatively large subarea of the loading area and to secure them by means of a joint load securing device, he is responsible that all these pieces of the load will be captured from this load securing device and that all these pieces under the load securing device are supported against each other sufficiently.

A message of the required number and tension of the belts is preferably shown on a display which represents the loading area of the vehicle and the approximate outline of the load as well as its weight. The respective recognized belts are represented by lines. The colour red symbolizes that the belt is present but not sufficiently pretensioned. When the required pretensioning force is reached the colour changes to green. Pressing the button "load securing o.k.?" informs the user where and how many belts are still missing, or if the load securing is correct according to the available data of the central control unit.

These informations from the central control module preferably should be routed during loading to a smartphone or another mobile display which the driver or another person in charge of the vehicle can see while working on the lashing of the load. During the journey these informations should be accessible from the smartphone or from another display in the driver's field of vision. As proof of the proper securing of the load, it is helpful when the data about the load and its securing are printed and/or archived at the end of the loading process. It is a possible variant of the inventive monitoring of the load securing device that a printed report or the storing of the data in the control module is the only use. The invention is not limited to any particular form of data usage.

In the following further details and features of the invention are explained in more detail by means of an example. However this is not intended to limit the invention, but merely to elucidate it. It is shown schematically:

FIG. 1 is a side elevation view of a truck with a load and a monitored load securing device.

FIG. 1 shows the side view of a vehicle (1), in this case a truck, which is equipped with a loading area (2) which is loaded with a load (3). Lashing eyes (21) are mounted on the loading area (2) into which a load securing device (4) is hooked, in this case a lashing belt (4). For the sake of clarity the belt is marked with a very thick line. A tensioning device (41) is inserted into its front part, which can be recognized by its semicircular side part, which carries a shaft (not visible here) for winding the belt.

FIG. 1 clearly shows how the lashing belt (4) is hooked into the front lashing eye (21), is guided there from over all edges of the load (3) with an edge protector and with its other end hooked into the rear lashing eye (21).

Near the front end of the lashing belt (4), a safety sensor (5) according to the invention is inserted with a rectangular housing. In FIG. 1 it can be immediately understood that a tensioning force in the longitudinal direction of the lashing belt (4) also elongates the safety sensor (5). This—very small—extension can be detected, for example, by a strain gauge—not shown here. It is also not shown how the output of the strain gauge is transferred by means of a radio transmitter to the antenna (62). FIG. 1 shows how the signal flows via a cable into the central control unit (61) for evaluation. The result is passed via a cable in the driver's cab (6) to the display (63) in the field of vision of the driver and shown visually.

The two load detectors (7) at the front and rear edges of the loading area (2) are necessary for the full range of function of the load monitoring according to the invention. In FIG. 1 concentric circular arc segments symbolize that radar waves or ultrasonic signals are emitted which are reflected from the surfaces of the load (3) and are sent back to receivers (not shown) in the load detectors (7). In FIG. 1 two further load detectors (7) are not visible near the other longitudinal edge of the loading area (2) which is also not visible here. In total the loading area (2) is equipped with four load detectors (7) at all the corners. Thereby all the outer surfaces of the load (3) are identified by the load detectors (7) and reported via a radio connection (not shown here) to the antenna (62) and from there to the central control unit (61). With these four signals it is calculated in the central control unit (61), where approximately the outer edges of the load (3) are located and what the distance to the lashing eyes (21) is.

In FIG. 1 the load detectors (7) are shaped as an angular lever, which is articulated below the loading area (2) and protrudes beyond the loading area (2) only with a tip being bevelled on both sides. Normally this lever is pressed against the underside of the loading area (2) by a spring (not shown). If, during loading or unloading, a load (3) is pushed over the edge of the loading area (2), the load detectors (7) fold downwards and are not damaged.

The weight of the load (3) is detected by the central control unit (61) via sensors (not shown here) on the air suspension of the rear axle and then calculated from the recorded data in the control module (61) in which lashing eyes (21) a lashing belt (4) is to be hooked in and which pretensioning force is to be applied, according to the regulations.

In FIG. 1 a second lashing belt (4), which is orientated in a right angle to the direction of travel of the vehicle (1), can be added to the lashing eye (21) in the middle.

In FIG. 1 the lashing angle α between the lashing belt (4) and the loading area (2) is approximately 60°. This value is clearly below the limit of approximately 83°, below which the pretensioning force must be increased as a function of the sine of the lashing angle α. This enlargement can be clearly understood in FIG. 1 if a force vector is imagined in the direction of the lashing belt (4), which vector is split into its perpendicularly and horizontally to the loading surface (2) extending components.

In FIG. 1 it is not explicitly delineated that the current value of the angle α is transmitted wirelessly to the central control unit (61) and a correction factor for the pretensioning force in the lashing belt (4) is calculated therein.

LIST OF REFERENCE SIGNS

α lashing angle between load securing device 4 and loading area 2
1 vehicle
2 loading area on the vehicle 1
21 lashing eye on loading area 2
3 load, placed on loading area 2
4 load securing device for fastening of load 3, e.g. a lashing belt
41 tensioning device of a belt as load securing device 4
5 safety sensor, detects the pretensioning force of all load securing devices 4
6 drivers cab of the vehicle 1
61 central control unit, connected with all safety sensors 5 and all load detectors 7
62 antenna for wireless connection between the central control unit 61, the safety sensors 5 and the load detectors 7
63 display for the results of the evaluations from the central control unit 61
7 Load detector, detects the presence of load 3 on the loading area 2

The invention claimed is:

1. A vehicle which has a loading area, on which a load can be placed and
by means of at least one load detector the presence of said load on said loading area can be detected, and
by means of a central control unit
the signals of all said load detectors can be detected, and
the measured value of the mass of said load can be detected,
wherein
said load can be secured by means of at least one movable, mechanical and flexible load securing device, which can be brought into contact with said load, and
by means of at least one safety sensor the value of the force can be detected with which said load securing device acts on said load and
for this force said central control unit
calculates a reference value, depending on the mass of said load and according to a formula for the relevant applicable regulations, and
thereupon checks, if the actual value is sufficient.

2. A vehicle according to claim 1,
wherein
the loading area can be separated in two or more subareas, which are equipped with at least one mechanical load securing device and
one or more load detectors detect, which subareas of the loading area are occupied with a load and
the control unit detects all the occupancies.

3. A vehicle according to claim 1,
wherein
the load detector directly detects the load to be checked by being engineered as
an ultrasound sensor or
a laser or
a light barrier or
a radar with electromagnetic waves or
a camera with an image evaluation or
another sensing device, which acts directly onto the load.

4. A vehicle according to claim 1,
wherein
the load detector checks the presence of the load and the mass of the load is deduced from the comparison of the respective states and/or the measured values before and after the loading of the vehicle
by means of a switch and scanning the load with a pivoted leaver or a pushrod or another mechanical system, which will be moved when the mass of the load touches the loading area or
by means of measuring the pressure in at least one gas-filled cushion on the loading area or
by means of measuring the change in the ground clearance or the contraction of the undercarriage or measuring of the change in the pressure in gas-filled tires of a land craft or an aircraft still on the ground or
by means of the measurement of the change in the mean immersion depth of a vessel or by means of the measurement of the deformation of a supporting structure below the loading area.

5. A vehicle according to claim 1,
wherein
the load securing devices and a safety sensor, which may be connected to it can be detachably mounted in one of several different locations on the loading area and by means of a GPS-Module (Global-Positioning-System-Module) or an onboard position-finding system can be detected wirelessly the respective position of the load securing devices and can be displayed on the central control unit.

6. A vehicle according to claim 1,
wherein
in the case of the integration of a safety sensor in a rope, a chain or another longish and movable load securing device a further sensor detects the lashing angle $\alpha$ between the load securing device and the loading area and signals it to the central control unit.

7. A vehicle according to claim 1,
wherein
In the central control unit out of the information
about the respective location of beginning and ending of each longish load securing device on the loading area and
about the actual adjustment of the pretensioning force and
about the approximate size and limitation and mass of the load is calculated and reported to the outside
whether a sufficient number of load securing devices is present and
whether these load securing devices are sufficiently pre-tensioned.

8. A vehicle according to claim 1,
wherein
in the central control unit out of the information
about the respective location of beginning and ending of each longish load securing device on the loading area and
about the actual adjustment of the pretensioning force and
about the approximate size and limitation and mass of the load is calculated and reported to the outside
how large the required number of load securing devices In the direction of travel and transversely to the direction of travel has to be.

9. A vehicle according to claim 1,
wherein
the central control unit has a memory for the results of the interrogation of the load detectors and of the safety sensors, and in said memory the results of at least the last interrogation can be stored and/or can be displayed on a display in the drivers cab of the vehicle and/or can be interrogated by a control point outside the vehicle.

* * * * *